US010481806B2

(12) United States Patent
Mehrotra et al.

(10) Patent No.: US 10,481,806 B2
(45) Date of Patent: Nov. 19, 2019

(54) METHOD OF ENHANCING THE PERFORMANCE OF STORAGE SYSTEM THROUGH OPTIMIZATION IN COMPRESSED VOLUME MIGRATION

(71) Applicant: International Business Machines Corporation, Armonk, NY (US)

(72) Inventors: Sumit Mehrotra, Pune (IN); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/465,469

(22) Filed: Mar. 21, 2017

(65) Prior Publication Data

US 2018/0275896 A1    Sep. 27, 2018

(51) Int. Cl.
*G06F 3/06*    (2006.01)
*G06F 11/20*   (2006.01)

(52) U.S. Cl.
CPC .......... *G06F 3/0619* (2013.01); *G06F 3/0617* (2013.01); *G06F 3/0647* (2013.01); *G06F 3/0665* (2013.01); *G06F 3/0689* (2013.01); *G06F 11/20* (2013.01)

(58) Field of Classification Search
CPC .... G06F 3/0608; G06F 3/0611; G06F 3/0613; G06F 3/0647; G06F 3/0683
See application file for complete search history.

(56) References Cited

U.S. PATENT DOCUMENTS

| 7,751,407 | B1 * | 7/2010 | Don | H04L 47/283 |
| | | | | 370/395.21 |
| 9,081,510 | B2 | 7/2015 | Green et al. | |
| 9,715,434 | B1 * | 7/2017 | Xu | G06F 3/0608 |
| 2005/0071560 | A1 | 3/2005 | Bolik | |
| 2005/0108304 | A1 | 5/2005 | Wilson et al. | |
| 2006/0212625 | A1 * | 9/2006 | Nakagawa | G06F 3/0608 |
| | | | | 710/68 |
| 2006/0212746 | A1 * | 9/2006 | Amegadzie | G06F 17/30221 |
| | | | | 714/6.3 |

(Continued)

OTHER PUBLICATIONS

Petter Svard et al., "Evaluation of Delta Compression Techniques for Efficient Live Migration of Large Virtual Machines" AMC, VEE '11 Proceedings of the 7th ACM SIGPLAN/SIGOPS international conference on Virtual execution environments, 11 pages.

*Primary Examiner* — Hal Schnee
(74) *Attorney, Agent, or Firm* — .Kunzler Bean & Adamson (57) ABSTRACT

A data migration management apparatus includes a data migration module, a decompression module, and a consolidation module. The data migration module determines a plurality of compressed extents on a source controller are subject to a data migration process to a target controller. The decompression module receives an input/output request at a storage virtualization controller, from a host application, after the data migration process has begun. A response to the input/output request includes decompressing one of the plurality of compressed extents on the source controller not yet migrated. The consolidation module executes the response to the input/output request and writes to the target controller from a single decompressed extent.

13 Claims, 5 Drawing Sheets

(56) References Cited

U.S. PATENT DOCUMENTS

| | | | |
|---|---|---|---|
| 2006/0236054 A1* | 10/2006 | Kitamura | G06F 3/0605 711/165 |
| 2008/0307191 A1 | 12/2008 | Lane et al. | |
| 2009/0037679 A1* | 2/2009 | Kaushik | G06F 3/0617 711/162 |
| 2010/0228903 A1 | 9/2010 | Chandrasekaran et al. | |
| 2012/0005423 A1 | 1/2012 | Zhuang et al. | |
| 2012/0203996 A1 | 8/2012 | Anderson et al. | |
| 2015/0012697 A1* | 1/2015 | Enohara | G06F 3/0686 711/111 |
| 2015/0356078 A1* | 12/2015 | Kishimoto | G06F 17/30079 707/610 |
| 2015/0370501 A1 | 12/2015 | Aikoh et al. | |
| 2015/0370505 A1* | 12/2015 | Shuma | G06F 3/0647 711/165 |
| 2017/0090777 A1* | 3/2017 | Horn | G06F 3/0608 |

* cited by examiner

METHOD OF ENHANCING THE PERFORMANCE OF STORAGE SYSTEM THROUGH OPTIMIZATION IN COMPRESSED VOLUME MIGRATION

FIELD

The subject matter disclosed herein relates to data migration and more particularly relates to enhanced data migration through optimization in compressed volume data migration.

BACKGROUND

Data migration is the transferring of data between storage subsystem types, formats, or computer systems. These systems, types, or formats can be similar or dissimilar. Migration is usually performed under program control to try to make movement of data as complete and as automated as possible. Data migration is needed when you change computer systems or upgrade to new products. As with any data center change, you want to avoid disrupting or disabling active applications while still achieving an efficient migration. Compressing and uncompressing data may utilize a large number of computer resources.

BRIEF SUMMARY

An data migration management apparatus is disclosed. The data migration management apparatus includes a data migration module, a decompression module, and a consolidation module. The data migration module determines a plurality of compressed extents on a source controller are subject to a data migration process to a target controller. The decompression module receives an input/output request at a storage virtualization controller, from a host application, after the data migration process has begun. A response to the input/output request includes decompressing one of the plurality of compressed extents on the source controller not yet migrated. The consolidation module executes the response to the input/output request and writes to the target controller from a single decompressed extent.

A method for managing data migration is also disclosed. The method includes determining a plurality of compressed extents on a source controller are subject to a data migration process to a target controller. The method further includes receiving an input/output request at a storage virtualization controller, from a host application, after the data migration process has begun. A response to the input/output request includes decompressing one of the plurality of compressed extents on the source controller not yet migrated. The method further includes decompressing the one of the plurality of compressed extents at the storage virtualization controller to produce a decompressed extent. The method further includes executing the response to the input/output request and writing to the target controller from the decompressed extent.

A computer program product is also disclosed. The computer program product includes a computer readable storage medium having program instructions embodied therewith. The program instructions readable/executable by a processor to cause the processor to determine a plurality of compressed extents on a source controller are subject to a data migration process to a target controller. The program instructions readable/executable by the processor to further cause the processor to receive an input/output request at a storage virtualization controller, from a host application, after the data migration process has begun. A response to the input/output request includes decompressing one of the plurality of compressed extents on the source controller not yet migrated. The program instructions readable/executable by the processor to further cause the processor to decompress the one of the plurality of compressed extents at the storage virtualization controller to produce a decompressed extent. The program instructions readable/executable by the processor to further cause the processor to execute the response to the input/output request and write to the target controller from the decompressed extent.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer or other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations which are not shown or described in detail to avoid obscuring aspects of an embodiment.

Data migration is the transferring of data between storage subsystem types, formats, or computer systems. These systems, types, or formats can be similar or dissimilar. Migration is usually performed under program control to try to make movement of data as complete and as automated as possible. Data migration is needed when you change computer systems or upgrade to new products. As with any data center change, you want to avoid disrupting or disabling active applications while still achieving an efficient migration. Users might migrate data for many reasons. Some reasons might include a need for new storage devices with increased size and/or for more flexibility, to resolve performance issues, or to physically reduce the footprint of a storage subsystem within the data center and release space. Other reasons may include to reduce the costs of power consumption, to implement a disaster recovery solution, or to physically relocate a data center, etc.

One major consideration during a migration process is performance, (i.e., how quickly data is copied from a source device to a target device). The process should balance performance against network bandwidth and system resources. For example, data that is copied at a high rate but consumes too many system resources can severely affect system performance or a production application. If data is copied too slowly, the migration process can take a significant amount of time, potentially prolonging downtime of an application.

The performance of migration is also dependent on which type of disk data is in the process of migration. If the data is stored in the form of compressed storage LUNs or the volumes used in deduplication, then the migration takes time to seek the data as every byte need to be computed or decompressed before actual copy operation is done.

Many migrations are done without interrupting the I/O from the host applications connected to it. If an application is performing heavy I/O on the compressed disk then, the migrator demon needs time to complete the migration to the target controller as every READ I/O needs to go through the target disk and same block also required decompression and reading for migration. This will increase the CPU cycles required in overall migration of data in particular volume disk as the same data will go through compression/decompression for read/write I/O and also during data migration.

The process of reducing the size of a data file and/or block is referred to as data compression. Data compression involves encoding information using fewer bits than the original representation. Compression is performed by a program that utilizes a formula or algorithm to determine how to shrink the size of the data. Compression is useful because it helps reduce resource usage, such as data storage space. Because compressed data must be decompressed to use, this extra processing imposes computational or other costs through decompression.

While many embodiments are described herein, at least some of the described embodiments of the invention relate generally to storage migration and, more particularly, to migration involving storage virtualization. The amount of digital data is growing rapidly. The use of a storage area network (SAN) connecting one or more host computers with one or more storage subsystems is one way to store digital data in the storage subsystems and allow access from the host computers. As technology advances and storage devices age, the storage subsystems will need to be replaced. To replace the storage subsystems, the storage administrator will need to perform several operations such as data migration, re-configuration (I/O path, security, LUN setting, etc.), and so forth. Some embodiments facilitate efficient use of system resources in data migration. Some embodiments reduce processing of decompression by performing a migration in conjunction with an input/output request.

The description of elements in each figure may refer to elements of proceeding figures. Like numbers refer to like elements in all figures, including alternate embodiments of like elements.

Figure 1:
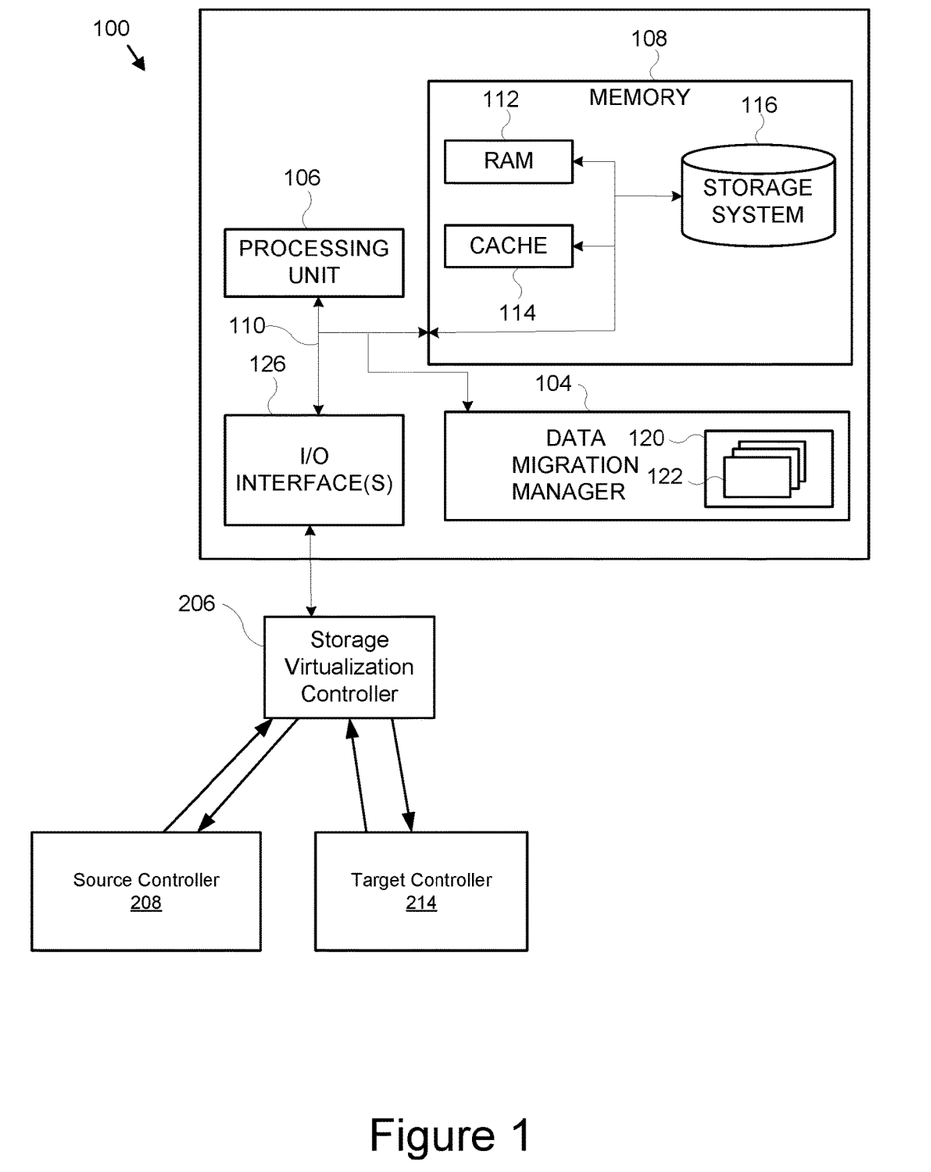
FIG. 1 is a schematic diagram illustrating one embodiment of a computer system that is applicable to implement the embodiments of the present invention.

FIG. 1 shows an exemplary computer system 100 that is applicable to implement the embodiments of the present disclosure. Computer system 100 is only illustrative and is not intended to suggest any limitation as to the scope of use or functionality of embodiments of the disclosure described herein. The components of computer system 100 may include, but are not limited to, a data migration manager 104, one or more processors or processing units 106, a system memory 108, I/O interfaces 126, and a bus 110 that couples various system components including system memory 108 to processor 106.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 typically includes a variety of computer system readable media. Such media may be any available media that is accessible by computer system 100, and it includes both volatile and non-volatile media, removable and non-removable media.

System memory 108 can include computer system readable media in the form of volatile memory, such as random access memory (RAM) 112 and/or cache memory 114. Computer system 100 may further include other removable/non-removable, volatile/non-volatile computer system storage media. By way of example only, storage system 116 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 110 by one or more data media interfaces. As will be further depicted and described below, data migration manager 104 may include at least one program product having a set (e.g., at least one) of program modules 122 that are configured to carry out the functions of embodiments of the disclosure. In some embodiments, the program product 120 is stored on memory 108.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data, or some combination thereof, may include an implementation of a networking environment. Program modules 122 generally carry out the functions and/or methodologies of embodiments of the disclosure as described herein.

Computer system 100 may also communicate with one or more external devices such as a keyboard, a pointing device, a display, etc.; one or more devices that enable a user to interact with computer system 100; any devices (e.g., network card, modem, etc.) that enable computer system 100 to communicate with one or more other computing devices; and/or a storage virtualization controller 206. Such communication can occur via input/output (I/O) interfaces 126. Still yet, computer system 100 can communicate with one or more networks such as a local area network (LAN), a general wide area network (WAN), a storage area network (SAN), and/or a public network (e.g., the Internet) via network adapter. A network adapter communicates with the other components of the computer system 100 via bus 110. While not shown, other hardware and/or software components could be used in conjunction with computer system 100. Examples, include, but are not limited to, microcode, device drivers, redundant processing units, external disk drive arrays, RAID systems, tape drives, and data archival storage systems, etc.

In one embodiment, the computer system 100 is part of or is in communication with a network such as a storage area network (SAN) and a storage virtualization controller 206. Communication with other devices, apparatuses, or systems on the network may be handled by the I/O interfaces 126 or the network adapter as needed. In some embodiments, the computer system 100 includes various modules, described in greater detail below, to manage one or more assets. In some embodiments, the computer system 100 manages read or write requests and data migration processes performed by the storage virtualization controller 206. In other embodiments, the computer system 100 independently or in conjunction with other systems or devices, tracks data migration and read/write requests to efficiently migrate data from a source controller 208 to a target controller 214. Fewer or more than these functions and other functions may be accomplished wholly or in part by the computer system 100 or another embodiment of the computer system 100. In some implementations, the computer system 100 is part of the storage virtualization controller 206.

Figure 2:
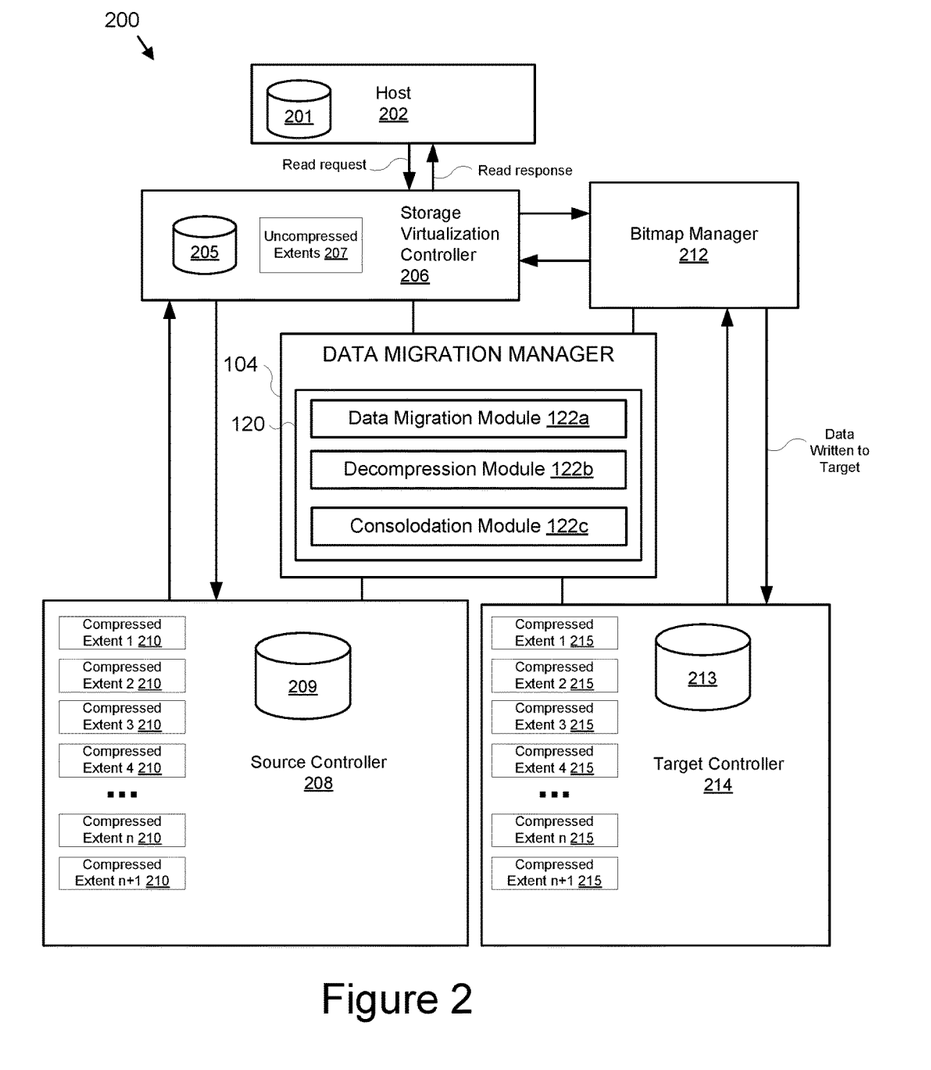
FIG. 2 is a schematic block diagram illustrating one embodiment of an arrangement of integrating a read request with a data migration process in accordance with the present invention.

FIG. 2 is a schematic diagram illustrating one embodiment of an arrangement 200 of integrating a read request with a data migration process in accordance with the present invention. In the illustrated embodiment, a storage virtualization controller 206 is performing a data migration process from a source controller 208 to a target controller 214. During the data migration process, the storage virtualization controller 206 read requests data from the source controller 208 and receives a read response from source controller 208 for each compressed extent 210. In some embodiments, the storage virtualization controller 206 will perform this data migration sequentially or in another order for all compressed extents (1, 2, 3, . . . n, n+1 . . . ). The storage virtualization controller 206 will decompress the compressed extents 210 into an uncompressed extent 207 and then write the data corresponding to the compressed extents 210 to target controller 214. The write operation may occur after following an algorithm (which may be the same as used for source controller 208 or particular to target controller 214) to compress the uncompressed extent 207 to a compressed extent 215 particular to target controller 214. In some embodiments, the compression algorithm may be the same for the target controller 214 as the source controller 208. In some embodiment, the compression algorithm for the target controller 214 is different from the compression algorithm for the source controller 208. Although shown as compressed extents 215 at the target controller 214 in the depicted embodiment, in some implementations, the extents are not compressed before writing to the target controller 214.

During the data migration process, it may be important to not interrupt input/output requests from host applications to the data being migrated. Input/output requests also utilize decompression processes at the storage virtualization controller 206. Such decompression processes are time and process intensive. Embodiments described herein include combining the decompression step for an input/output request with the decompression step of the data migration process to reduce or eliminate a decompression step. Embodiments include performing data migration for a compressed extent 210 when the compressed extent 210 is decompressed to execute a response to an input/output request from a host 202.

In the illustrated embodiment, the storage virtualization controller 206 receives an input/output request from a host application 202 that includes a storage system 201. The input/output request from the host application 202 is a read request for data on one of a plurality of compressed extents 210 (for example, compressed extent n) from the source controller 208 that includes various storage systems 209. A response to the read request includes a decompression step in which compressed extent n 210 is decompressed at the storage virtualization controller 206. The storage virtualization controller 206 decompresses compressed extent n 210 to create an uncompressed extent 207. In some embodiments, the decompression step that occurs to satisfy the request triggers the data migration manager 104 to determine if compressed extent n 206 is subject to a data migration process. In some embodiments, the decompression step that occurs to satisfy the request triggers the data migration manager 104 to determine if compressed extent n 210 has been migrated to target controller 214 or not.

In the illustrated embodiment, the data migration manager 104 determines that compressed extent n 206 is subject to a data migration process. After determining that compressed extent n 206 is subject to a data migration process, the data migration manager 104 determines that the compressed extent n 210 has not yet been migrated to target controller 214. In some embodiments, the data migration manager 104 utilizes a bitmap manager 212 to determine if compressed extent n 210 has been migrated to target controller 214. If the data migration manager 104 determines that the compressed extent n 206 has not yet migrated then the storage virtualization controller 206 will execute the response to the input/output request by executing a read response to the host application 202 and will further write the data corresponding to compressed extent n 210 to the target controller 214. The storage virtualization controller 206 will update the bitmap manager 212 to note that compressed extent n 210 has been migrated to target controller 208.

In some embodiments, the writing data corresponding to compressed extent n 210 to the target controller 214 and the executing the read response to the input/output request occur concurrently. In some embodiments, the writing data corresponding to compressed extent n 210 to the target controller 214 and the executing the read response to the input/output request occur sequentially. In some embodiments, the executing the read response to the input/output request occurs before the writing data corresponding to compressed extent n 210 to the target controller 214. In some embodiments, the writing data corresponding to compressed extent n 210 to the target controller 214 occurs before the executing the read response to the input/output request. In some embodiments, the writing data corresponding to compressed extent n 210 to the target controller 214 and the executing the read response to the input/output request occur simultaneously. In some embodiments, the writing data corresponding to compressed extent n 210 to the target controller 214 and the executing the read response to the input/output request do not occur sequentially, but do result from the same decompression step and the same decompressed extent 207.

Once the compressed extent n 210 has been migrated to the target controller 214 and the bitmap manager 212 has been updated, compressed extent n 210 no longer needs to be decompressed and migrated during the normal data migration process. In some embodiments, the storage virtualization controller 206 will resume migrating data in the predetermined sequence of migration (1, 2, 3 . . . n, n+1 . . . ) or another order. In some embodiments, as the storage virtualization controller 206 performs the sequence of migration (1, 2, 3 . . . n, n+1 . . . ), the data migration manager will skip decompressed extent n 210 as it has been migrated in conjunction with the response to the input/output request.

In some embodiments, the data migration manager 104 includes a data migration module 122a. In some embodiments, the data migration module 122a is configured to determine that a plurality of compressed extents 210 on the source controller 208 are subject to a data migration process to a target controller 214.

In some embodiments, the data migration manager 104 includes a decompression module 122b. In some embodiments, the decompression module 122b is configured to receive an input/output request at the storage virtualization controller 206. In some embodiments, the decompression module 122b is configured to receive the input/output request from a host application. In some embodiments, the request is received after the data migration process has begun. In some embodiments, the request is received before the data migration process has begun. In some embodiments, the input/output request begins the data migration process with the compressed extent n which is also subject to the input/output request. In some embodiments, the response to the input/output request includes decompressing the compressed extent n 210. The input/output request may be a read or write request that requires that the compressed extent n 210 be decompressed in a decompression step.

In some embodiments, the data migration manager 104 includes a consolidation module 122c. In some embodiments, the consolidation module 122c is configured to execute the response to the input/output request and write to the target controller from the same uncompressed extent 207. The response to the input/output request and data migration to the target controller may occur concurrently, sequentially, or non-sequentially from the same uncompressed extent 207.

Figure 3:
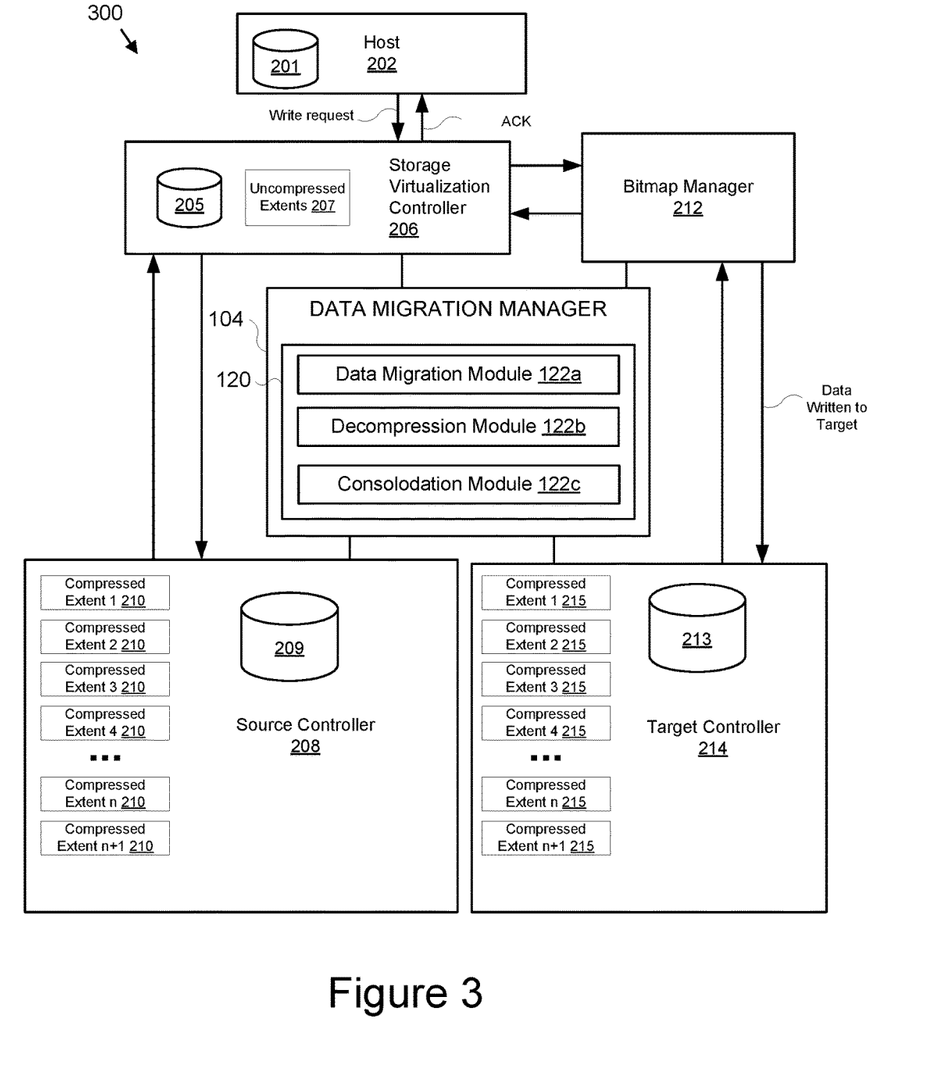
FIG. 3 is a schematic diagram illustrating one embodiment of an arrangement of integrating a write request with a data migration process in accordance with the present invention.

FIG. 3 is a schematic diagram illustrating one embodiment of an arrangement 300 of integrating a write request with a data migration process in accordance with the present invention. In the illustrated embodiment, a storage virtualization controller 206 is performing a data migration process from a source controller 208 to a target controller 214 similar to the process described in conjunction with FIG. 2.

In the illustrated embodiment, the storage virtualization controller 206 receives an input/output request from a host application 202 that includes a storage system 201. The input/output request from the host application 202 is a write request corresponding to data on one of a plurality of compressed extents 210 (for example, compressed extent n) on the source controller 208 that includes various storage systems 209. A response to the write request includes a decompression step in which compressed extent n 210 is decompressed at the storage virtualization controller 206. The storage virtualization controller 206 decompresses compressed extent n 210 to create an uncompressed extent 207. In some embodiments, the decompression step that occurs to satisfy the request triggers the data migration manager 104 to determine if compressed extent n 206 is subject to a data migration process. In some embodiments, the decompression step that occurs to satisfy the request triggers the data migration manager 104 to determine if compressed extent n 210 has been migrated to target controller 214 or not.

In the illustrated embodiment, the data migration manager 104 determines that compressed extent n 206 is subject to a data migration process. After determining that compressed extent n 206 is subject to a data migration process, the data migration manager 104 determines that the compressed extent n 210 has not yet been migrated to target controller 214. In some embodiments, the data migration manager 104 utilizes a bitmap manager 212 to determine if compressed extent n 210 has been migrated to target controller 214. If the data migration manager 104 determines that the compressed extent n 206 has not yet migrated, then the storage virtualization controller 206 will execute the response to the input/output request by executing a write response to the source controller 208 and will further write the data corresponding to compressed extent n 210 to the target controller 214. The storage virtualization controller 206 will update the bitmap manager 212 to note that compressed extent n 210 has been migrated to target controller 208 including the data corresponding the write request.

In some embodiments, the writing data corresponding to compressed extent n 210 to the target controller 214 and the executing the write response to the input/output request occur concurrently. In some embodiments, the writing data corresponding to compressed extent n 210 to the target controller 214 and the executing the write response to the input/output request occur sequentially. In some embodiments, the executing the write response to the input/output request occurs before the writing data corresponding to compressed extent n 210 to the target controller 214. In some embodiments, the writing data corresponding to compressed extent n 210 to the target controller 214 occurs before the executing the write response to the input/output request. In some embodiments, the writing data corresponding to compressed extent n 210 to the target controller 214 and the executing the write response to the input/output request occur simultaneously. In some embodiments, the writing data corresponding to compressed extent n 210 to the target controller 214 and the executing the write response to the input/output request do not occur sequentially, but do result from the same decompression step and the same decompressed extent 207.

Once the compressed extent n 210 has been migrated to the target controller 214 and the bitmap manager 212 has been updated, compressed extent n 210 no longer needs to be decompressed and migrated during the normal data migration process. In some embodiments, the storage virtualization controller 206 will resume migrating data in the predetermined sequence of migration (1, 2, 3 . . . n, n+1 . . . ) or another order. In some embodiments, as the storage virtualization controller 206 performs the sequence of migration (1, 2, 3 . . . n, n+1 . . . ), the data migration manager will skip decompressed extent n 210 as it has been migrated in conjunction with the response to the input/output request.

Figure 4:
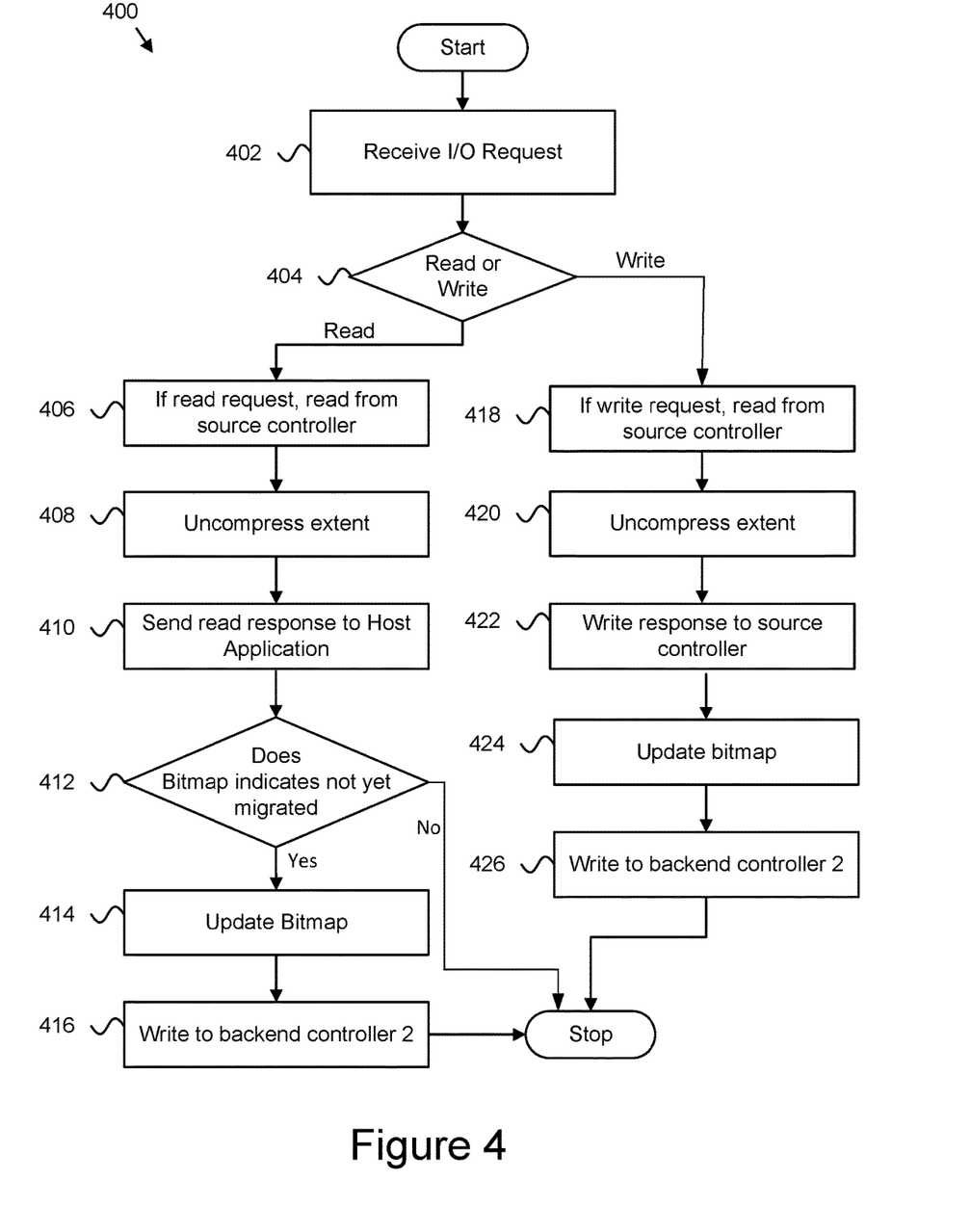
FIG. 4 is a schematic flow chart diagram illustrating one embodiment of a method in accordance with the present invention.

FIG. 4 is a schematic flow chart diagram illustrating one embodiment of a method 400 in accordance with the present invention. At block 402, the method 400 includes receiving an input/output request from a host application. At block 404, it is determined whether the request is a read request or a write request. If it is determined that a read request has occurred, then, at block 406, a read request is sent to a source controller and a read response is received at a storage virtualization controller. At block 408, the data subject to the read request (a compressed extent) is decompressed. At block 410, the data is sent to the host application. At block 412, it is determined at a bitmap manager if the data has not yet been migrated to a target controller. If the data has not yet been migrated, then at block 414, the bitmap is updated and at block 416, the data is written to the target controller.

Returning to block 404, if it is determined that a write request has occurred, then, at block 418, the data is read from the source controller. At block 420, the data subject to the write request (a compressed extent) is decompressed. At block 422, the write response executed at the source controller. If the data has not yet been migrated then, at block 424, the bitmap is updated and, at block 426, the data is written to the target controller.

Figure 5:
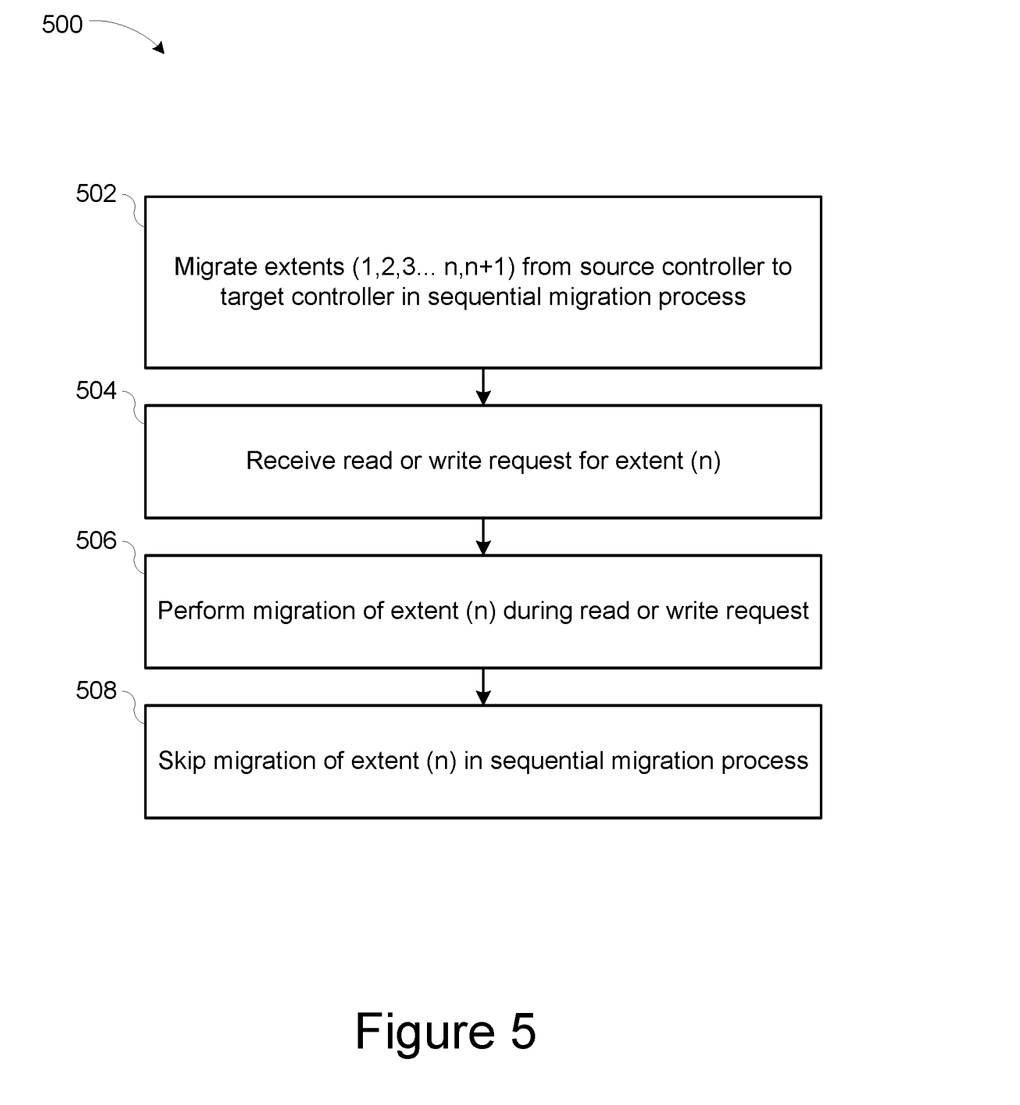
FIG. 5 is a schematic flow chart diagram illustrating one embodiment of a method in accordance with the present invention.

FIG. 5 is a schematic flow chart diagram illustrating one embodiment of a method 400 in accordance with the present invention. At block 502, the method 500 includes migrating a plurality of compressed extents (1, 2, 3, . . . , n, n+1) from a source controller to a target controller in a sequential data migration process. At block 504, a read or write request is received corresponding to a compressed extent (n) not yet migrated. At block 506, extent (n) is migrated to target controller in conjunction with the response to the read or write request. At block 508, the migration of extent (n) is skipped in the sequential data migration process.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for managing data migration, comprising:
determining that a plurality of compressed extents, that have been compressed by a first compression algorithm, on a source controller are subject to a data migration process to a target controller, and executing the data migration process, where the data migration process comprises performing sequentially, for each of the plurality of compressed extents:
determining if a current extent of the plurality of compressed extents has already been migrated;
skipping, in response to a determination that the current extent has already been migrated, the current extent;
decompressing, in response to a determination that the current extent has not already been migrated, the current extent to form a decompressed extent;
migrating, in response to the decompressing, the decompressed extent to the target controller;
updating a bitmap of migrated extents to include an indicator that the current extent has been migrated; and
recompressing the decompressed extent utilizing a second compression algorithm;
concurrent with the execution of the data migration process, and in response to receiving an input/output request from a host application for a requested one of the plurality of compressed extents on the source controller, where the requested one has not yet been migrated by the data migration process, inserting an out-of sequence response to the input/output request into the data migration process, where the out-of-sequence response comprises:
decompressing the requested one to form a requested decompressed extent;
migrating the requested decompressed extent to the target controller;
updating the bitmap of migrated extents to include an indicator that the requested one has been migrated;
recompressing the requested one utilizing a second compression algorithm; and
resuming, sequentially, the data migration process.

2. The method of claim 1, wherein the input/output request comprises a read request, and wherein the executing the response to the input/output request comprises providing a read response to the host application.

3. The method of claim 1, wherein the input/output request comprises a write request, and wherein the executing the response to the input/output request comprises providing a write response to the target controller and wherein the writing to the target controller and the executing the response to the input/output request occur simultaneously.

4. The method of claim 1, further comprising determining a predetermined sequence of migration of the plurality of compressed extents on the source controller.

5. The method of claim 4, further comprising resuming the predetermined sequence of migration of the plurality of compressed extents in response to a determination that the out-of-sequence response has completed.

6. A data migration management apparatus, comprising:
a data migration module that determines that a plurality of compressed extents, that have been compressed by a first compression algorithm, on a source controller are subject to a data migration process to a target controller, and executes the data migration process, where the data migration process comprises performing sequentially, for each of the plurality of compressed extents:
determining if a current extent of the plurality of compressed extents has already been migrated;
skipping, in response to a determination that the current extent has already been migrated, the current extent;
decompressing, in response to a determination that the current extent has not already been migrated, the current extent to form a decompressed extent;
migrating, in response to the decompressing, the decompressed extent to the target controller;
updating a bitmap of migrated extents to include an indicator that the current extent has been migrated; and
recompressing the decompressed extent utilizing a second compression algorithm;
a decompression module that, concurrent with the execution of the data migration process, receives an input/output request from a host application for a requested one of the plurality of compressed extents on the source controller not yet migrated by the data migration process; and
a consolidation module that, in response to receiving the input/output request, inserts an out-of-sequence response to the input/output request into the data migration process, where the out-of-sequence response comprises:
  decompressing the requested one to form a requested decompressed extent;
  migrating the requested decompressed extent to the target controller;
  updating the bitmap of migrated extents to include an indicator that the requested one has been migrated;
  recompressing the requested one utilizing a second compression algorithm;
  resuming, sequentially, the data migration process.

7. The apparatus of claim 6, wherein the input/output request comprises a read request, and wherein executing the response to the input/output request comprises providing a read response to the host application.

8. The apparatus of claim 6, wherein the input/output request comprises a write request, and wherein executing the response to the input/output request comprises providing a write response to the target controller.

9. The apparatus of claim 6, wherein the data migration module determines a predetermined sequence of migration of the plurality of compressed extents on the source controller.

10. The apparatus of claim 9, wherein the data migration module resumes the predetermined sequence of migration of the plurality of compressed extents in response to a determination that the out-of-sequence response has completed.

11. A computer program product for providing data migration management, the computer program product comprising a computer readable storage medium having program instructions embodied therewith, the program instructions readable/executable by a processor to cause the processor to:
  determine that a plurality of compressed extents, that have been compressed by a first compression algorithm, on a source controller are subject to a data migration process to a target controller, and execute the data migration process, where the data migration process comprises performing sequentially, for each of the plurality of compressed extents:
    determining if a current extent of the plurality of compressed extents has already been migrated;
    skipping, in response to a determination that the current extent has already been migrated, the current extent;
    decompressing, in response to a determination that the current extent has not already been migrated, the current extent to form a decompressed extent;
    migrating, in response to the decompressing, the decompressed extent to the target controller;
    updating a bitmap of migrated extents to include an indicator that the current extent has been migrated; and
    recompressing the decompressed extent utilizing a second compression algorithm;
  concurrent with the execution of the data migration process, and in response to receiving an input/output request from a host application for a requested one of the plurality of compressed extents on the source controller not yet migrated by the data migration process, inserting an out-of-sequence response to the input/output request into the data migration process, where the out-of-sequence response comprises:
    decompressing the requested one to form a requested decompressed extent;
    migrating the requested decompressed extent to the target controller;
    updating the bitmap of migrated extents to include an indicator that the requested one has been migrated;
    recompressing the requested one utilizing a second compression algorithm;
    resuming, sequentially, the data migration process.

12. The computer program product of claim 11, the program instructions readable/executable by the processor to further cause the processor to determine a predetermined sequence of migration of the plurality of compressed extents on the source controller.

13. The computer program product of claim 12, the program instructions readable/executable by the processor to further cause the processor to resume the predetermined sequence of migration of the plurality of compressed extents in response to a determination that the out-of-sequence response has completed.

* * * * *